(No Model.)
W. BEVAN.
SAFETY ATTACHMENT FOR BICYCLES.
No. 319,385. Patented June 2, 1885.
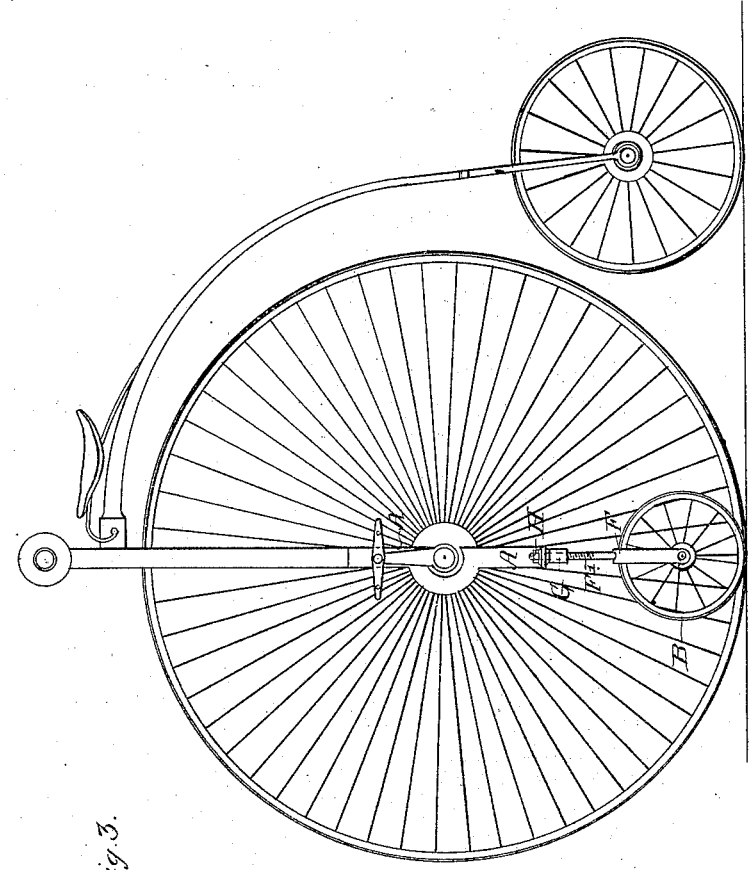
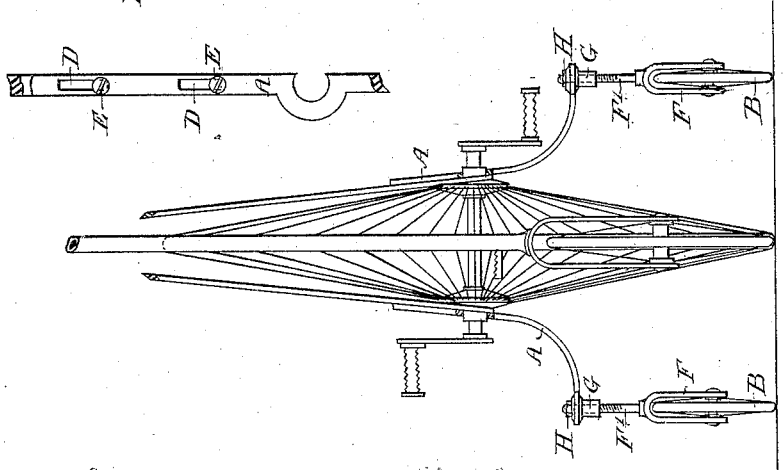
Witnesses
William Bevan

UNITED STATES PATENT OFFICE.

WILLIAM BEVAN, OF LONDON, ENGLAND.

SAFETY ATTACHMENT FOR BICYCLES.

SPECIFICATION forming part of Letters Patent No. 319,385, dated June 2 1885.

Application filed October 23, 1884. (No model.)

*To all whom it may concern:*

Be it known that I, WILLIAM BEVAN, a subject of the Queen of England, residing at London, England, have invented a new and useful Improved Bicycle Safety Attachment for Learners, of which the following is a specification.

This invention will be best understood by reference to the accompanying drawings, in which Figure 1 is a side elevation of a bicycle fitted with this appliance; Fig. 2, an end view of the same, and Fig. 3 a detail view.

To each side of the fork of the large wheel is secured an arm, A, preferably extending outwardly, as shown, so as to afford a broader wheel-base, as in Fig. 2, and carrying the little wheel B, the height of which can be adjusted so as to be nearer to or farther from the ground, according to the wish of the rider.

As shown in Fig. 2, the wheels are upon the same level as the large wheel, and the machine is well supported, so that a person ignorant of the art of riding a bicycle can ride a machine fitted with this appliance. If the wheels B be raised from the ground a short distance, considerable swaying of the machine will be possible without its quite tumbling over.

The adjustability of the height of the wheels B may be provided for where its fork joins the arm; or the whole arm may be adjustable upon the fork of the large wheel, as shown in Fig. 3, where A is the arm, having slots D fitting over pins or bolts E, the nut or head of which may be screwed up tight, so as to fix the arm at the exact position desired.

In Fig. 2 the upper portion, F', of the fork F, which carries the little wheel, is screw-threaded and screws into the boss G at the end of the arm A, a lock-nut, H, fixing it in position.

If preferred, the part F' may be squared for part of its length, to fit a correspondingly-shaped hole in the boss G, so that the wheel may not be turned sidewise, and may always run parallel with the large wheel. In this case a long barrel-nut is provided upon the boss, so that it can be turned at pleasure and force the fork up or down, the end of the part F' beyond the square being screwed for this purpose.

I claim—

The combination, with the steering-fork of a bicycle, of the arm A, rigidly attached thereto, having at its end a screw-threaded boss, the auxiliary fork bearing a wheel and having screw-threaded portion F', and the lock-nut H, for fixing it in position, substantially as described.

In testimony whereof I have hereunto subscribed my hand in the presence of two subscribing witnesses.

WILLIAM BEVAN.

Witnesses:
 BERNHARD DUKES,
 HENRY BRIDGE.